(12) United States Patent
Boggavarapu

(10) Patent No.: US 10,213,047 B2
(45) Date of Patent: Feb. 26, 2019

(54) COFFEE PREPARATION SYSTEM

(71) Applicant: Seva Coffee Corporation, San Carlos, CA (US)

(72) Inventor: Deepak Boggavarapu, San Carlos, CA (US)

(73) Assignee: Seva Coffee Corporation, San Carlos, CA (US)

(*) Notice: Subject to any disclaimer, the term of this patent is extended or adjusted under 35 U.S.C. 154(b) by 0 days.

(21) Appl. No.: 15/694,431

(22) Filed: Sep. 1, 2017

(65) Prior Publication Data

US 2017/0360242 A1  Dec. 21, 2017

Related U.S. Application Data

(63) Continuation-in-part of application No. 15/346,456, filed on Nov. 8, 2016, now abandoned, which is a continuation of application No. 15/018,548, filed on Feb. 8, 2016, now abandoned, which is a continuation (Continued)

(51) Int. Cl.
| | |
|---|---|
| *A47J 31/00* | (2006.01) |
| *A47J 31/40* | (2006.01) |
| *A47J 31/42* | (2006.01) |
| *A23N 12/08* | (2006.01) |
| *A47J 31/44* | (2006.01) |
| *A47J 42/52* | (2006.01) |
| *A23N 12/12* | (2006.01) |

(52) U.S. Cl.
CPC .............. *A47J 31/42* (2013.01); *A23N 12/08* (2013.01); *A23N 12/125* (2013.01); *A47J 31/407* (2013.01); *A47J 31/4492* (2013.01); *A47J 42/52* (2013.01)

(58) Field of Classification Search
CPC .......... A47J 42/00; A47J 31/00; A47J 31/005; A47J 31/40; A47J 42/52
USPC ........................... 99/286, 306, 290, 279–283
See application file for complete search history.

(56) References Cited

U.S. PATENT DOCUMENTS

| | | | | |
|---|---|---|---|---|
| 2,783,149 | A | * | 2/1957 | Epstein ..................... A23F 5/26 426/432 |
| 2,795,181 | A | * | 6/1957 | Scolari ................. A23N 12/083 99/348 |
| 3,153,377 | A | | 10/1964 | Bosak |

(Continued)

FOREIGN PATENT DOCUMENTS

| | | |
|---|---|---|
| EP | 0041082 A1 | 9/1981 |
| RU | 2006118703 C2 | 8/2009 |

(Continued)

OTHER PUBLICATIONS

Consumer Reports, "Pod Coffeemakers: Three DeLonghi models top our tests," Sep. 2013, pp. 48-49.

(Continued)

*Primary Examiner* — Michael Laflame, Jr.
(74) *Attorney, Agent, or Firm* — Cognition IP, P.C.; Bryant Lee

(57) ABSTRACT

A coffee preparation machine can include at least one sealed pod containing unroasted green coffee beans, a roasting system that accepts the at least one sealed pod, a grinding system, and a brewing system, where the brewing system, the roasting system, and the grinding system can be housed within a single self-contained unit.

20 Claims, 5 Drawing Sheets

Related U.S. Application Data of application No. 14/028,306, filed on Sep. 16, 2013, now abandoned.

(60) Provisional application No. 61/743,946, filed on Sep. 15, 2012.

(56) References Cited

U.S. PATENT DOCUMENTS

| | | | |
|---|---|---|---|
| 4,484,064 A | 11/1984 | Murray | |
| 4,895,308 A | 1/1990 | Tanaka | |
| 5,083,502 A | 1/1992 | Enomoto | |
| 5,190,228 A | 3/1993 | Ficken et al. | |
| 5,287,795 A | 2/1994 | Enomoto | |
| 5,307,733 A | 5/1994 | Enomoto | |
| 5,322,005 A * | 6/1994 | Enomoto | A47J 31/42 241/100 |
| 5,325,765 A | 7/1994 | Sylvan et al. | |
| 5,463,932 A | 11/1995 | Olson | |
| 5,840,189 A | 11/1998 | Sylvan et al. | |
| 6,106,877 A * | 8/2000 | Allington | A23F 5/04 426/233 |
| 6,227,102 B1 | 5/2001 | Sham et al. | |
| 6,260,479 B1 * | 7/2001 | Friedrich | A23F 5/04 34/233 |
| 6,339,985 B1 | 1/2002 | Whitney | |
| 6,988,444 B1 | 1/2006 | Pfeifer et al. | |
| 7,143,686 B1 * | 12/2006 | Sandolo | A23F 5/04 99/286 |
| 7,469,627 B2 | 12/2008 | Li | |
| D587,510 S | 3/2009 | Lam | |
| 7,581,488 B2 * | 9/2009 | Caswell | A47J 31/42 99/280 |
| 7,858,135 B2 | 12/2010 | Radosav | |
| 2004/0149138 A1 * | 8/2004 | Leung | A47J 31/043 99/279 |
| 2005/0095341 A1 | 5/2005 | Sher et al. | |
| 2005/0109213 A1 * | 5/2005 | Terada | A47J 31/005 99/279 |
| 2005/0139084 A1 | 6/2005 | Caswell | |
| 2008/0303478 A1 | 12/2008 | Lee et al. | |
| 2009/0219140 A1 * | 9/2009 | Guard | A47J 31/4492 340/10.1 |
| 2009/0293733 A1 | 12/2009 | Martin et al. | |
| 2010/0203209 A1 * | 8/2010 | Fishbein | A47J 31/18 426/433 |
| 2012/0024160 A1 * | 2/2012 | Van Os | A47J 31/42 99/280 |
| 2012/0156339 A1 | 6/2012 | Studor et al. | |
| 2013/0180406 A1 * | 7/2013 | Hay | A23F 5/04 99/286 |
| 2014/0076167 A1 | 3/2014 | Boggavarapu | |
| 2014/0242239 A1 | 8/2014 | Boggavarapu | |
| 2016/0150908 A1 | 6/2016 | Boggavarapu | |
| 2016/0174590 A1 | 6/2016 | Boggavarapu | |
| 2017/0049264 A1 | 2/2017 | Boggavarapu | |
| 2018/0000108 A1 | 1/2018 | Boggavarapu | |

FOREIGN PATENT DOCUMENTS

| | | |
|---|---|---|
| WO | 2003062101 A2 | 7/2003 |
| WO | 2014043652 A1 | 3/2014 |

OTHER PUBLICATIONS

International Search Report and Written Opinion received for International App. No. PCT/US2013/060007, dated Jan. 16, 2014, 18 pages.

International Preliminary Report on Patentability received for International App. No. PCT/US2013/060007, dated Mar. 17, 2015, 11 pages.

Watling et al., "The Application of Solution and Laser Ablation Based ICP-MS and Solution Based AES for the Provenance Determination of Selected Food and Drink Produce," The Open Chemical and Biomedical Methods Journal, 2010, vol. 3, pp. 179-196.

Krusenstjerna, "Coffee Maker Roats Grinds & Brews," YouTube Video, Apr. 24, 2008, available at http://www.youtube.com/watch?v=uyjPPYeGf4Q, 3 minutes.

O'Connell, "Inside the Keurig Vue V700, a Single-Serve Coffee Maker," The New York Times, Aug. 14, 2013, available at http://www.nytimes.com/interactive/2013/08/14/business/how-a-keurig-vue-works.html?_r=1&, 1 page.

Kraft Foods Group, "Tassimo—Home," Tassimo Website, http://www.tassimodirect.com, Oct. 4, 2015, archived version available at http://web.archive.org/web/20151004120659/http://www.tassimodirect.com/, 4 pages.

European Search Report and Written Opinion received for European App. No. 13837304.8, dated May 6, 2016, 7 pages.

* cited by examiner

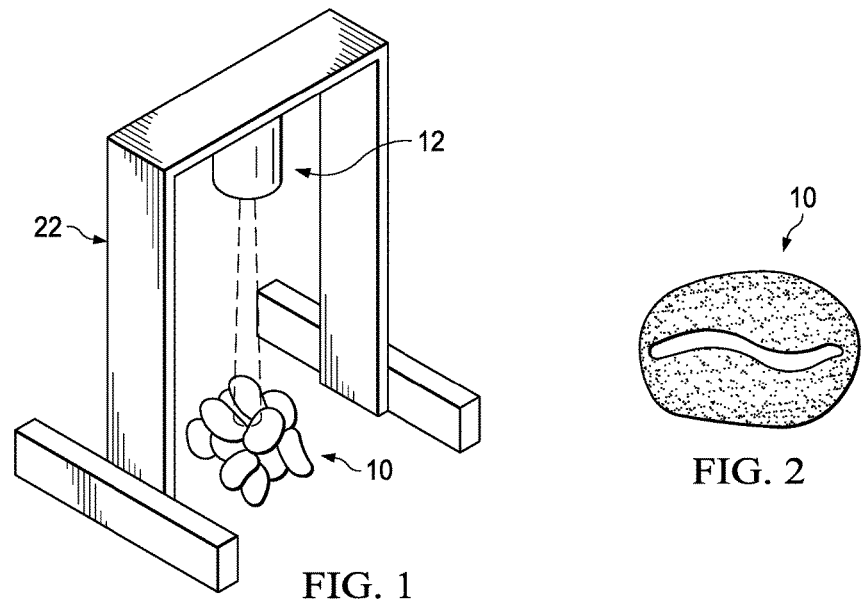
FIG. 1
FIG. 2
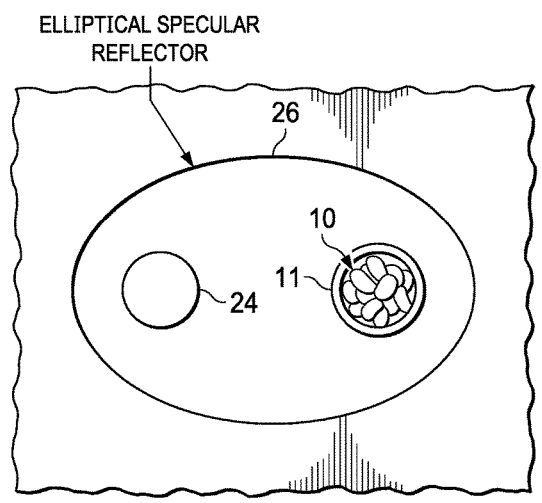
FIG. 3

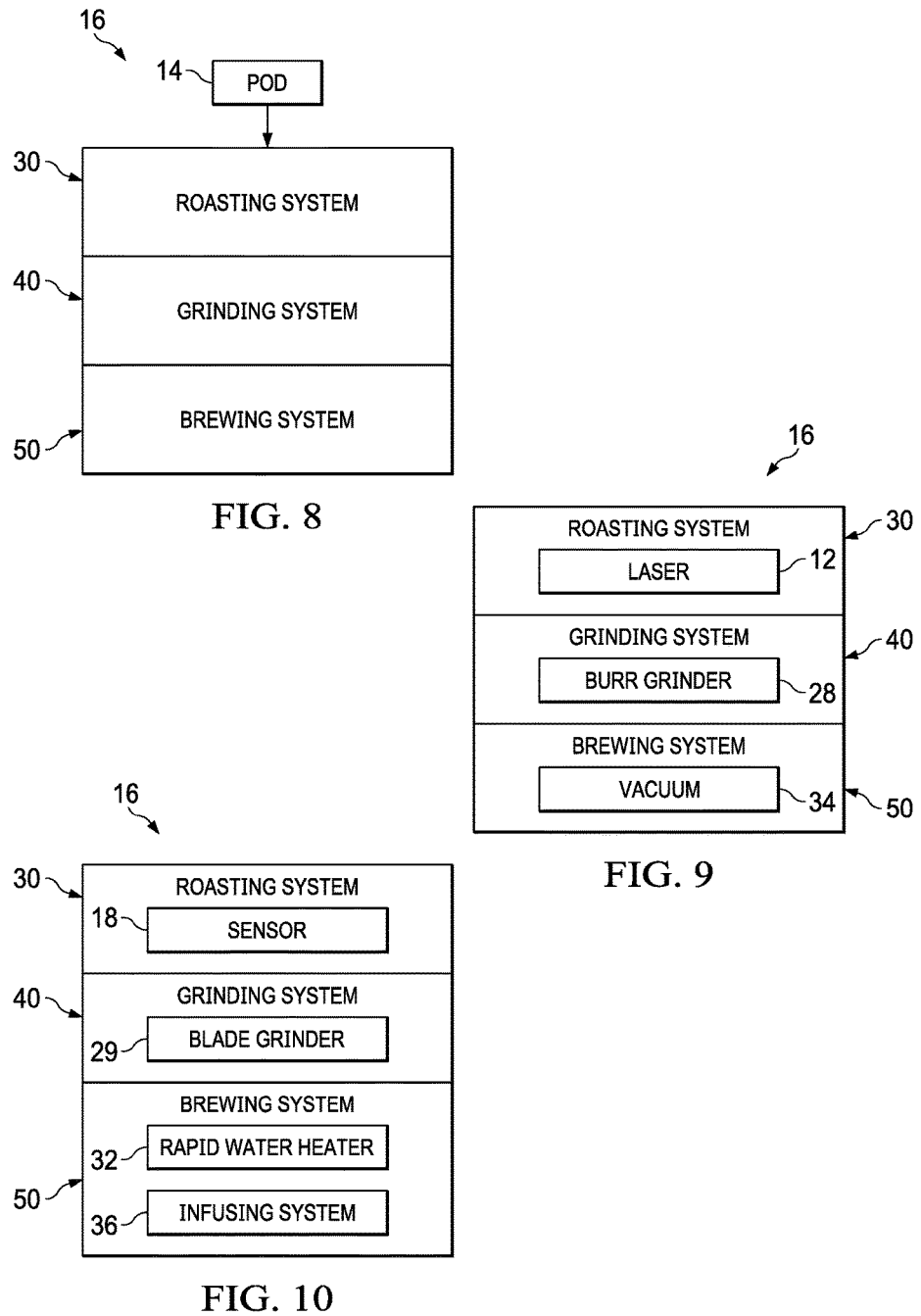

COFFEE PREPARATION SYSTEM

REFERENCE TO RELATED APPLICATION

The present application is a continuation of U.S. non-provisional application Ser. No. 15/346,456, which was filed on Nov. 8, 2016, which claims priority to U.S. non-provisional application Ser. No. 15/018,548, which was filed on Feb. 8, 2016, which claims priority to U.S. non-provisional patent application Ser. No. 14/028,306, which was filed on Sep. 16, 2013, which claims the priority benefit of U.S. provisional patent application Ser. No. 61/743,946, filed Sep. 15, 2012, and hereby incorporates the same applications by reference in their entirety.

TECHNICAL FIELD

This invention describes a new method and machine to make coffee. In addition a new type of packaging for coffee is disclosed that maintains the freshness of the bean while allowing easy distribution and verification of bean authenticity.

BACKGROUND

Coffee has traditionally been made using a three step process: roasting of coffee beans, grinding of roasted beans, and brewing of ground beans in hot water to extract the flavor into a beverage. These three steps are traditionally done at different times and locations. Roasting is typically done in large industrial machines in large batches of many pounds to hundreds of pounds at a time. Roasted beans or ground beans are shipped to local retailers and this step can take weeks to months before the package arrives for the consumer to brew, where the consumer may be the retail home consumer or other businesses such as coffee shops that brew and sell coffee. Roasted beans decay in freshness and taste from the moment the roast is completed as chemical compounds formed in the bean during roasting deteriorate. The decay of roasted beans leads to a less desirable taste of coffee. Thus all coffee made today is stale due to the time delay from roasting to brewing.

SUMMARY

Embodiments of a coffee preparation machine include at least one pod containing coffee beans, a roasting system that accepts the at least one sealed pod, a grinding system, and a brewing system, where the brewing system, the roasting system, and the grinding system are housed within a single self-contained unit.

BRIEF DESCRIPTION OF THE DRAWINGS

FIG. 1 depicts an example of laser heating to roast coffee beans. Laser light delivered via an optical fiber is directed down onto coffee beans;

FIG. 2 depicts an example of a laser roasted coffee bean.

FIG. 3 depicts a cross-section of an elliptical cavity for lamp pumped coffee bean roasting according to one embodiment, where the elliptical reflector focuses light onto the coffee beans.

FIG. 8 depicts a schematic of one embodiment of a coffee preparation machine having a roasting system, a grinding system, and a brewing system, where the coffee preparation machine is shown associated with a pod.

FIG. 9 depicts a schematic of one embodiment of a coffee preparation machine with a roasting system having a laser, a grinding system having a burr grinder, and a brewing system having a vacuum.

FIG. 10 depicts a schematic of one embodiment of a coffee preparation machine with a roasting system having a bean fracker and an optical sensor, a grinding system having a blade grinder, and a brewing system having an infusing system and a rapid water heater.

DETAILED DESCRIPTION

Figure 4:
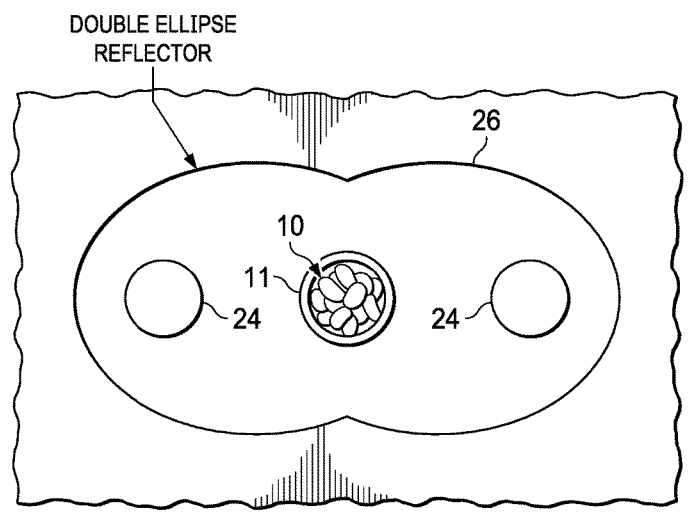
FIG. 4 depicts a cross-section of an elliptical cavity for lamp pumped coffee bean roasting according to an alternate embodiment, where the elliptical reflector focuses light onto the coffee beans.
Figure 5:
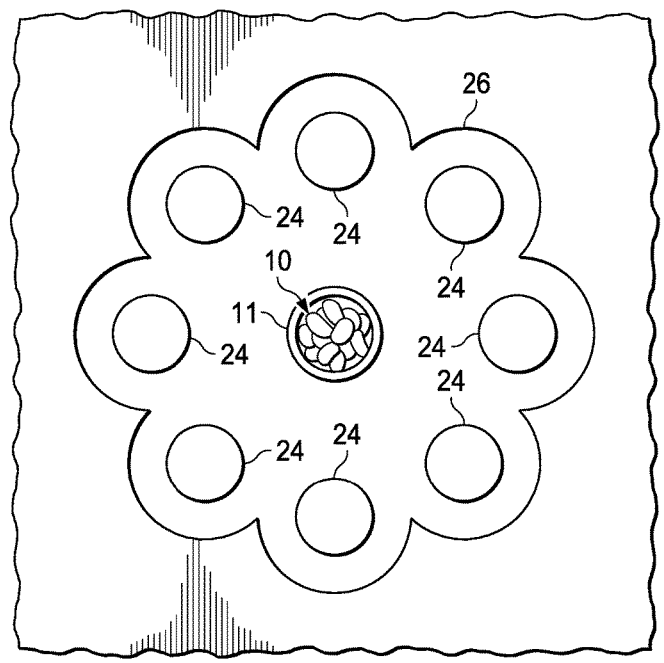
FIG. 5 depicts a cross-section of multi-ellipse cavity for lamp pumped coffee bean roasting according to one embodiment, where the elliptical reflector focuses light onto the coffee beans.
Figure 6:
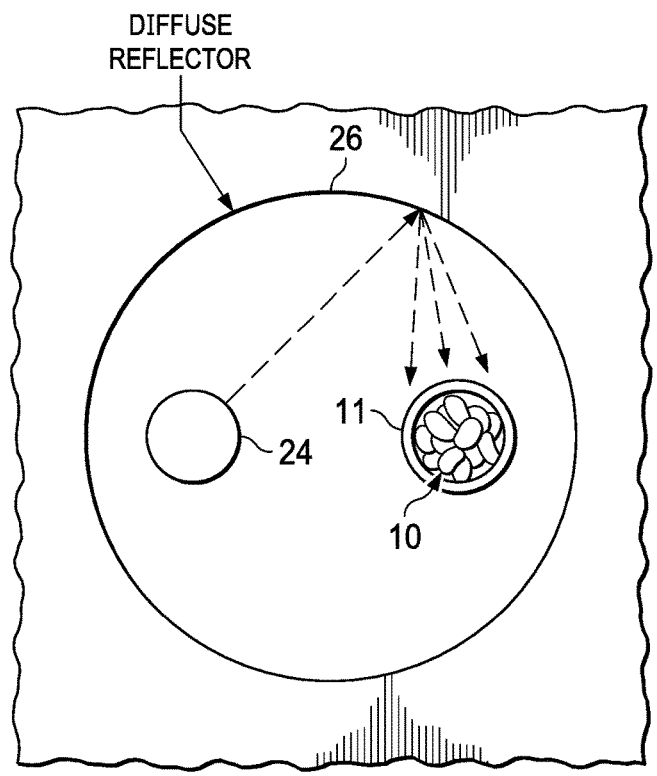
FIG. 6 depicts a cross-section a diffuse reflector cavity for lamp pumped coffee bean roasting according to one embodiment.
Figure 7:
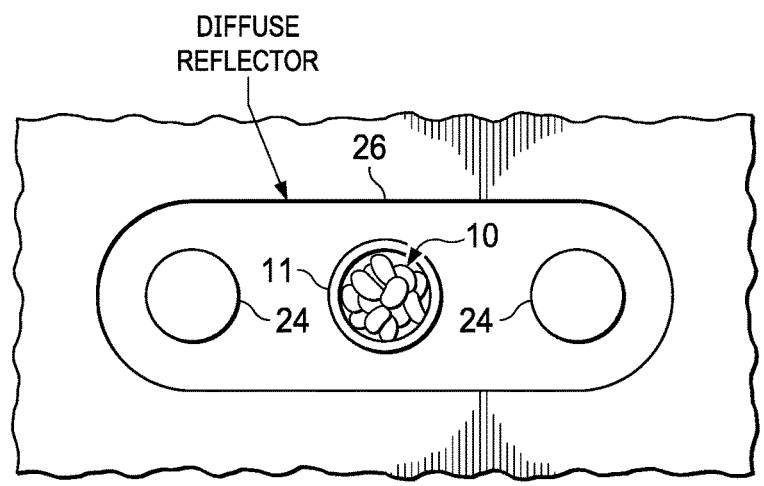
FIG. 7 depicts a cross-section a diffuse reflector cavity for lamp pumped coffee bean roasting according to an alternate embodiment.

The taste of coffee is determined by the type of coffee beans used and by numerous process parameters in each step of making the coffee beverage. A key set of parameters influencing coffee taste, happen during roasting. The roast process is typically done in an industrial batch setting as described above and the end consumer has no control over the roast process and, thus, the taste of the coffee beverage as determined by bean roast. Additionally, the degree of roasting for each bean type can transform the taste of the final coffee beverage to an individual consumer's liking, yet this degree of control does not exist in the coffee industry today. A consumer may buy prepackaged beans with different degrees of roast but the user cannot dial-in and control the roast of beans to taste.

Coffee has evolved in recent years from a widespread commodity product with 'generic' tasting coffee products to specialty coffee where specific beans, origin location, microclimates, growing conditions, year of production, and processing conditions are tracked and marketed. These variations in the source beans affect the taste of the coffee beverage and, thus, are tracked and marketed to the final consumer. Coffee has many aromatic compounds that affect aroma and taste, where coffee contains more aromatic compounds than wine. Just as wine is marketed by region, year, vineyard, etc., with varying prices for each, coffee can be marketed similarly. A key issue with such marketing is assuring the end consumer that the product being purchased is genuine and not counterfeit. This allows the consumer to know the value of his purchase and to possibly sell that product in the future for value that may increase or decrease.

To solve these and other problems we describe a series of embodiments that allow the preparation of the freshest and best tasting coffee ever made. The solution to the problems stated above is to change the method of coffee preparation at the consumer side and to change the distribution method of green coffee beans from plantation to consumer.

Coffee Bean Verification

Coffee plants are grown in approximately fifty countries worldwide, typically in the tropical regions of the world, at high elevations. The coffee cherry is picked from the plant and after several process steps, dried green coffee beans are produced. These beans can vary widely in quality and taste leading to a large difference in price. Commodity green coffee beans are priced at approximately $2/pound and traded on international commodity markets. Specialty green coffee beans with specific taste and terroir have sold for up to $500/lb. However it is difficult for a person to determine the origin of a green bean by physical observation and, thus, expensive beans may be counterfeited. To prevent counterfeiting, several new embodiments are proposed.

As shown in FIG. 1, one embodiment includes laser marking each coffee bean 10 with a laser 12 to create a custom code that is difficult or impossible to copy. A key feature here is to mark the surface of bean only without damage to the inside of the bean. An alternate embodiment includes mechanical marking (not shown) of the surface of each bean with a specific code without damaging the inside of the bean. Embodiments include the application of visual marking material (not shown) to a coffee bean in a custom pattern that cannot be copied. This may include fluorescent materials that emit only when stimulated with the proper external optical stimulus. These materials may be organic (e.g., a green fluorescent protein or other materials) or inorganic. Of key importance is to use only biologically safe materials and materials that burn off during coffee roasting leaving no trace in appearance or taste.

In one embodiment, DNA sequencing of beans can be performed on reference bean samples from desired locations. This sequence data can be stored and compared to DNA sequence data of the green coffee beans at a later date to verify location of the bean. DNA can survive in the green coffee bean state, but degrades rapidly with increasing temperature (DNA denatures at just below 100 C). Thus, keeping beans in the green state until final consumption aids verification. Once the beans are roasted, extracting DNA sequence information from the bean becomes difficult or impossible. Such embodiments may provide a novel approach to provenancing.

A unique feature of the coffee preparation method embodiments described below is that the roasting is performed at the time of final beverage preparation by the consumer and thus these anti-counterfeiting methods will maintain their integrity through the distribution chain of coffee until the final preparation when verification testing can be performed, if desired. Traditional coffee preparation involves roasting at an earlier stage, as described above, and all marking methods would be destroyed during roasting.

A key parameter in specialty coffee is to validate the origin and terroir (special characteristics of the geography, geology and climate of a certain place) that affect coffee taste. This comes under the terminology of food provenancing (chronology of the ownership or location of a historical object). Embodiments include using spectroscopic methods to verify provenance of coffee beans by measuring spectroscopic data (e.g., molecular compounds, ratios of different elements, etc.) as close to the source location as possible and creating a library of coffee bean spectroscopic data. This library of data is used to compare with later spectroscopic measurements for verification when the provenance of any bean is called into question. Spectroscopic techniques to be used may include mass spectrometry, laser spectroscopy, LIBS (laser induced breakdown spectroscopy), ICP-MS (inductively coupled plasma mass spectrometry), or any other methods. A key feature of this invention is the use of spectroscopic signature to verify provenance to the location of coffee bean growth and the subsequent ability to verify beans after packaging into coffee pods. By keeping the beans in the green state, this spectroscopic information can be extracted, whereas this information may be destroyed at the temperatures of coffee roasting.

Coffee Pod Embodiments

A growth area in the coffee market is the use of single-serve coffee pods for consumer preparation of coffee in one cup portions. Advantages of coffee pods include convenience, single serve preparation so that coffee does not sit aging in pots, and ability for consumer to choose amongst pod types. For these reasons, coffee brewing machines using pods have exploded in sales growth in the last decade (e.g., SENSEO, NESPRESSO, KEURIG, etc.). These coffee pods typically are small plastic or metal containers with ground coffee and filter paper inside. These coffee machines and pods all use ground coffee and the machines only brew the coffee. As noted above, coffee degrades in freshness from the moment it is roasted, and degrades even more rapidly once it is ground, since increased surface area interacts with atmosphere.

Figure 13:
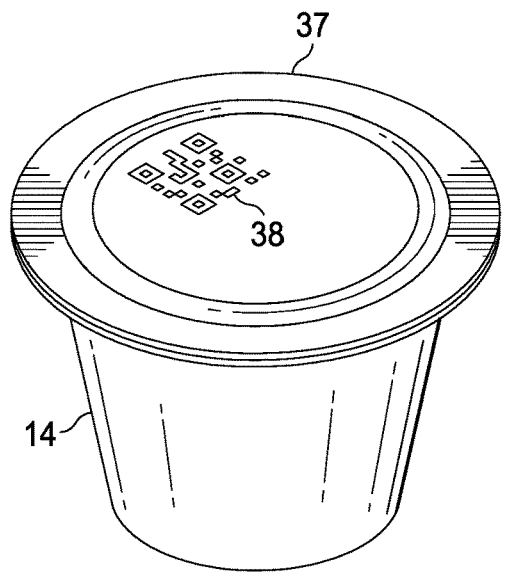
FIG. 13 depicts a perspective view of a pod containing green coffee beans according to one embodiment.

Embodiments include a new type of coffee pod in which green coffee beans are packaged into small enclosed containers or pods, where each pod (e.g., pod 14 shown in FIG. 13) contains enough green coffee beans to ultimately produce one serving of coffee. The pod 14 may be hermetically sealed with a seal 37. These pods can be used with a specially designed coffee preparation machine that is described herein. The novelty here is to use green coffee beans that have a long shelf life and do not degrade rapidly (shelf life of green coffee beans is years or more if stored properly). The coffee pod 14 is filled with a gas to preserve the enclosed beans without degradation to long periods (years to many years). This fill gas may be atmospheric air, nitrogen, inert gas, noble gas, or the pod 14 may be vacuum packed. In some cases the pod 14 may be filled with positive pressure gas (e.g., nitrogen, noble gas, or others). Each pod 14 would contain approximately 10-50 grams of green coffee beans. In certain cases, certain beans are known to improve with age and exposure to air, where pods 14 containing such beans may be packaged with a 'breathable membrane' (not shown) that allows air to be exchanged with the outside world. A further embodiment is to sort and package the green beans with beans of a similar size and color packaged into a single pod 14, and likewise do this for all pods 14. The value of this sorting is that roasting of all beans within a single pod will progress similarly when exposed to heat and thus produce a uniform roast. This sorting system may also sort out bad beans that may have phenol content or other impurities that impair taste of the final beverage. Further value of this sorting will become apparent in the discussion of the machine below.

The pod 14 can be marked with an information code 38 or bar code (not shown) that contains information about the beans in the pod 14. This information can be used by the machine described below and will: allow the machine to verify the authenticity of the coffee pod and prevent fake pods from working in the machine, and encode bean information and optimum preparation recipe instructions that the machine can read. The information code may be printed in some form not visible to naked eye to preserve the aesthetic appeal of the pod 14. The pod 14 may have features built into the design that either prevent tampering with the pod or indicate if tampering has occurred. Other features in the pod package may be deliberately designed to be hard to reproduce to act as anti-counterfeit measures. The pod 14 may be made of recyclable materials. The pod 14 may have features in the physical design to allow non-invasive measurement of the spectral features of the beans to verify provenance of the bean as described above. The pod 14 would be designed in conjunction with the machine described below so that the pod 14 fits into the machine and the machine automatically opens the pod 14 so the green coffee beans can be accessed for processing without contaminating the machine or green beans with remnants of the packaging material.

A key goal of the pod 14 and packaging methods mentioned above is to create a pod 14 that is designed for long life of the enclosed beans without bean degradation. In particular, the goal is to create the ecosystem for storing, collecting, trading, and consuming specialty green coffee beans that can be turned into a coffee beverage in an analogous manner to how fine wine is collected, stored, traded, and ultimately consumed. Fine wine may go up or down in value as the provenance of the specific wine gains or loses reputation amongst collectors of wine, and due to supply and demand constraints. Similarly, fine green coffee beans have analogous taste and aroma characteristics that cannot be artificially duplicated, so a limited supply of specialty beans can create a tradable value amongst connoisseurs. The purpose of high quality pod packaging described is to create a long lasting product (lasting years, decades, or longer) that enables a green coffee bean ecosystem to evolve just like the fine wine ecosystem. The coffee pods may be purchased for near term consumption or may be purchased for long term collectible value.

The pod 14 may contain green unroasted coffee beans where some processing step has been performed on the beans. One method may be to grind the beans in a factory setting and package the ground green beans into the pod 14. Grinding the beans first may help in faster roasting of beans (described below in the machine section). Another option may be to partially roast green coffee beans and package into the pod 14, which may save roasting time for the final consumer. However this partial roasting should be done in a way that preserves the freshness of the bean and prevents the decaying/staleness of the bean as in conventional roasting.

E-Commerce Embodiments

The coffee machine 16 (FIG. 8) described herein will have an internet connection and can upload and download information to or from computer servers attached to the internet. These servers may be owned and maintained by the company selling the coffee making machine and would provide numerous functions. The company would also maintain a website that would allow the sale of coffee preparation machines and coffee pods 14. The website would also have information to educate the consumer about the coffee pods and the provenance/terroir of the coffee pods. This information can include professional tasting ratings, user generated feedback forums on taste, and information about the source of each pod 14. A novel function of the website is allowing the auctioning or trading of coffee pods since the pods are designed to be collectible and may go up or down in value based on supply and demand. This portion of the website may function something like an EBAY for coffee pods, though a number of different auction methods may be used. This auction website may offer an additional service to buyer and seller to verify the pods for authenticity, non-tampering of pod, no air leak of the pod; etc.

The pods 14 will be sold with optimized preparation recipes encoded (explained more below in the machine section). However, the consumer may choose to experiment with process parameters to suite individual taste. The user may decide to upload their personal recipe for a specific pod type to the website for free access by all, or may choose to upload the recipe and charge others for access. The website would handle the transaction and take a percentage of sale price for facilitating transaction. Along similar lines, there may be chefs, celebrities, or others who may wish to create branded recipes specific to each type of pod 14. The website would facilitate the exchange and/or sale of these recipes (e.g., a Wolfgang Puck recipe for Guatemalan Finca bean, an Usain Bolt recipe for Jamaican Blue Mountain Coffee, etc.). This could be considered an analogy to how app stores have evolved for software on mobile phones except in this case it is an 'app store' for recipes for coffee preparation.

Coffee Preparation Machine Embodiments

The coffee preparation machine 16 is a key to the inventions described above and all the pieces described work together. Here we describe the inventions in coffee preparation enabled by the new coffee machine 16. Coffee preparation involves three keys steps: 1) roast green beans, 2) grind beans, 3) brew coffee. In all previous cases, roasting is done separately from grinding and brewing. Coffee machines exist on the market that brew coffee from ground coffee, coffee machines exist that grind roasted beans and brew coffee, and coffee machines exist that brew single serve coffee from coffee grounds packaged in pods, however, all of these machines require roasted coffee beans that have been roasted separately as mentioned previously. Here we describe for the first time a coffee machine 16 that encompasses roasting, grinding, and brewing in a single machine. The green coffee beans for this machine 16 are provided to the machine 16 in a standardized single serve pod 14 described above. Thus this machine 16 is a single serve roast/grind/brew machine that provides the user control over every step of the coffee preparation process and the freshest coffee ever made. Typically roasting of coffee beans is performed on large scale machines and can take up to 10-20 minutes per batch. Here, we describe technology to enable fast roasting of green beans in small quantity in less than three minutes so that the user does not have to wait a long time for coffee. We believe that delivering the ultimate cup of coffee to the consumer in a few minutes is key to enabling a viable machine since the user would not wait the 10-20 minute roast time of traditional roasting to get a cup of coffee. The features of this machine are novel and describe a new invention in the coffee industry. This machine 16 may be used in any number of professional/restaurant settings or may be used in the home.

Roasting Process

The traditional sequence of coffee making is to roast green beans, grind beans, and brew coffee. An alternative approach is to grind the green beans, roast the ground beans, and brew coffee. This alternative sequence is not done in any coffee making machine and thus is novel. The purpose of the alternative approach is that the green beans are ground to a small size, which results in more surface area exposed to heat during roasting and enabling faster, more uniform, heat transfer throughout the green bean particles. This allows more uniform roasting and faster roasting, both of which are desirable. Variations on this concept can include 1) coarse grind green coffee beans, 2) roast coarse grind beans, 3) fine grind the roasted particles, 4) brew coffee. Other slight variations in this sequence should be considered part of the novelty we suggest. Typically the three steps in making coffee mentioned above (roast, grind, brew) are done as three separate discrete steps. However, we propose a novel concept of partial or complete overlapping of these steps in time or space to reduce the total time required to make coffee. For example, the roasting and grinding may occur in the same vessel and the grinding may begin as some beans are roasted. Another example is that grinding and brewing may occur in the same vessel and the grinding may occur in a wet grind process which initiates the brewing process. Other variations of combining process steps can occur and we consider the concept of combining process steps in a single coffee making machine to be novel.

The machine, such as machine 16 shown in FIG. 10, may have an array of sensors 18 built in to measure process parameters along with feedback control systems to optimize the performance of each step the machine 16 performs (i.e., roast, grind, brew). For roasting such sensors may include a camera/color sensor to determine color change of beans during roasting, a humidity/water sensor to measure the water content in a roasting chamber 30, a humidity sensor for ambient local air, a carbon dioxide sensor to measure $CO_2$ emission during roasting, an optical spectroscopy system to measure chemical emissions during roasting, a temperature and time measurement along with roast profile control, and a microphone sensor to listen for first crack of the beans, second crack of the beans, and other noise emissions during roasting. For grinding, sensors 218 may include optical sensors to visually monitor grind size, use of a vibration sensor (e.g., an accelerometer) to monitor progress of grinding, a microphone to measure noise from grinder to determine grind size, etc. Since the grind process makes audible noise, it may be possible to use active noise canceling techniques along with an embedded audio speaker to mute or minimize the noise generated by the grinder 40. For the brewing system 50, sensors may include, a water temperature sensor, a water pressure sensor, a water pH sensor, an optical absorption sensor, an optical light scattering sensor, an optical polarization sensor to measure coffee extraction from the grind, a refractometer to measure coffee extraction, surface plasmon resonance (SPR) sensors to measure other chemical parameters of brewing, and other chemical sensors. The use of such sensors integrated into a coffee making machine for monitoring and feedback control is novel.

One of the key functions of the machine is the roasting of coffee beans in single serve portions with the green coffee beans provided in small pods. The roasting must happen quickly in order for the consumer to enjoy a cup of coffee within a few minutes. Traditional coffee bean roasting has been performed in large batches on industrial scale machines where roasting can take 10-20 minutes per batch, or in large industrial machines where the machine is continuously in operation and pre-heated to a high temperature such that roasting can be performed in a shorter time period. In both of these cases, these are large industrial machines that roast quantities from many pounds to thousands of pounds of green beans. The key difference here is that we need to rapidly roast a small quantity of green coffee beans (up to a 50 grams in weight) within a few minutes. This type of roasting machine is not currently made since we need very fast heat up time from the moment the user initiates the machine to make coffee. Roasting of coffee beans is typically done between 200 C to 300 C (and up to 500 C in some cases). Thus the roaster (e.g., roasting system 30 shown in FIG. 10) must rapidly rise in temperature from ambient temperature of approximately 20 C to several hundred degrees Celsius in a precisely controlled manner. Here we suggest ultrafast heater temperature increase ramp rate that can be in the range 1 to 10 C/second, 11 to 50 C/sec, 51 to 100 C/sec, 101 to 200 C/sec, or 201 C/sec and higher. Likewise at the end of roasting, the temperature must be rapidly cooled and thus the temperature decrease ramp rate can be in the range 1 to 10 C/second, 11 to 50 C/sec, 51 to 100 C/sec, 101 to 200 C/sec, etc. The overall time for roasting may be in the range of 1 to 30 seconds, 31 to 60 seconds, 61 to 90 seconds, 91 to 120 seconds, 121 to 300 seconds, etc. As described below, a rapid heating method is needed to roast the beans and this heat can be applied by convective, conductive, or radiation means. Thus the roasting portion of the entire machine is novel in that the quantity of beans and the speed of roasting is different from what is done currently.

In order to roast beans quickly, we need a fast heating method that enables rapid temperature rise of the bean. Conventional ovens use electrical resistor heating elements that heat the air in the chamber, and this air then heats the sample in question through convective heating. A direct approach to heating is to use laser 12 (FIG. 1) heating. In laser heating of green coffee beans, a laser of specific wavelength, spot size, and power level is directed via an optical system to the green coffee beans 10, which absorb the radiation and heat up. We have demonstrated that laser heating of green coffee beans can be used to rapidly roast green coffee beans. The use of a laser 12 allows direct heating of the bean 10 without heating up the air or other space around the bean 10. Also, this approach allows very precise delivery of heat to the bean 10 since the heat source can be removed when the laser 12 is turned off or blocked. The laser 12 can be operated in continuous mode, pulsed mode or some sequential combination of these modes to provide the exact dose of thermal energy to optimize bean 10 roasting (FIG. 2). This is a novel invention in that using lasers to rapidly roast green coffee beans has not been done before. The beans 10 may be agitated mechanically or with air to move them into the path of the laser beam. The laser beam delivery system may be mounted on a mechanical system 22 to move the beam across the array of coffee beans 10 that need to be roasted. Optical systems may be used to distribute the laser light uniformly upon the beans, or may be used to create a desired illumination profile across the coffee beans.

The laser 12 used for illumination may be a diode laser, a diode laser single emitter, an array of diode laser single emitters, a diode laser bar, or diode laser stack of bars as desired. The laser diodes may operate in the visible wavelength range, the near infrared wavelength range, or other infrared wavelength range. The wavelength of operation may be chosen to correspond with specific spectral absorption features of the coffee bean 10. A benefit of operating in the near infrared wavelength range is the commercial availability of high power laser diodes that have been developed for solid state laser pumping. The roasting may also be done using a combination of heating methods including laser radiation method along with convective resistive heating. In another embodiment of optical heating methods, a light emitting diode (LED) may be used instead of the laser light source with an appropriate optical system to direct the light from LED to the coffee beans. In another embodiment, microwave energy may be used to rapidly heat and roast the beans (e.g., a microwave oven).

As shown in FIGS. 3-7, another approach to roasting green coffee beans is again to use radiation heating. In this case, we can use infrared or visible wavelength emission lamps 24 as the heating element. The green coffee beans absorb the radiated light from the bulb and heat up until roasted (the bulb may emit in the visible wavelength range, infrared wavelength range or some bands of wavelengths deemed desirable such as MIR, FIR, etc.). The use of a lamp 24 allows fast roasting and direct heating of the green coffee bean 10 within a transparent tube 11 and is a novel invention. The lamp 24 can be operated in continuous, pulsed, or some combination of these modes, to provide the exact dose of thermal energy to optimize bean roasting. Lamps 24 emit light in multiple directions and some emitted light may not hit the beans. Thus to efficiently use the optical energy, it may be preferable to use optical cavity designs 26 to collect and direct the emitted light to the target coffee beans. Such optical cavity designs may include elliptical reflective cavities, multi-ellipse cavities, circular reflective cavities, etc. A number of cavity designs have been proposed in the lamp pumped laser industry that direct pump laser light to the absorbing laser rod. These cavity designs can be applied to roasting coffee whereby the laser rod is replaced with a glass tube containing coffee beans. Cross section diagrams of these geometries are shown in FIG. 3-7. It is a novel invention to use optical cavities 26 to capture and direct light to coffee beans for rapid roasting. The optical cavity 26 may also be designed to illuminate the beans 10 with a desired intensity profile for specific roasting as desired. The roasting may also be done using a combination of heating methods including lamp radiation method along with convective resistive heating. Though we have shown several cavity designs 26, there are other cavity designs that may be used that capture and direct light to a focal spot while also homogenizing the focal spot light intensity.

After roasting of coffee beans, it may be desirable to rapidly quench the beans 10 (i.e., rapidly cool down the beans) to stop the ongoing processes in the bean due to latent heat inside the bean. This may be done in one of several ways including water immersion quenching or forced air quenching. In particular, grinding the beans into small particles immediately after roasting increases surface area. Thus quickly grinding the beans and flowing air or water through the grinds quenches the bean from continuing to roast. In addition, the water used to brew the coffee serves also to quench the heat of the beans since the water used for brewing will be just under 100 Celsius in contrast to the several hundred degree Celsius roast temperature.

During roasting of green coffee beans, the color of the beans changes from green to dark brown/black depending on the length of time roasted (a longer time gives a darker color). Traditionally, these roast types and colors are denoted coarsely as cinnamon/New England; city/full city; Vienna; espresso; Italian; French. In our approach to roasting, the use of quantitative measurements and methods such as precision imaging and signal processing will allow us to denote a much finer gradation in roast progress and thus much finer taste control. As the beans are roasted, some smoke may be emitted and chaff is released from the outside skin of the bean. The machine 16 may capture the smoke and may capture the chaff. During the roasting process the beans emit a defined popping sound at different times during roasting known as first crack and second crack. These sounds are indicative of roasting process and audio monitoring of this sound with feedback control may be used to optimize roasting. During roasting, the beans emit an aroma that is pleasant to many people and a desirable trait to smell. The machine may have features to capture and disperse this aroma outside of the machine into the local environment for the pleasure of the consumer. In another variation, the machine may capture the aroma scent into a small container or other device that can be opened later to release the aroma as desired by the user (or the aroma containment system could be attached to a coffee cup with aroma released in a time release manner).

The machine 16 would be able to roast, grind, and brew, as mentioned above. Since the roasting process requires heat, it may be possible to recover extra waste heat from this process to heat or pre-heat the water needed for the brewing process. As one example, water may passed over the hot beans after roasting which serves to quench the beans and heat the water (but not limited to this method only). This is a novel approach to energy efficiency within the coffee machine and a new invention.

Roasting of beans 10 may also be done on an individual basis to optimize taste. This is a novel concept that has never been done before in coffee making since roasting has traditionally been a large industrial process. The quantity of green beans needed for a single cup of coffee may range from 50 to 500 beans. For this discussion we use 100 beans to simplify the discussion, but the concepts apply to any number of beans. When using a radiative light based heating system (e.g., laser, LEDs, lamp, etc.), the beans may be aligned in a pattern with a corresponding pattern of illumination sources (this may be a 1:1 mapping, or N:M mapping of sources to beans). An optical system may be used between the sources and beans such that each bean is illuminated by one light source with the desired illumination pattern. Each light source may have individual power control or sub-arrays of the light source may have a single power control. By using a 1:1 mapping of light sources to beans, each bean may now be illuminated and heated with individual control. A camera may be used to image the color of the beans and along with image processing algorithms used to feedback individual power adjustment control to the individual light sources to optimize roasting (a wavelength selective filter may be placed in front of the camera to filter out the light used to roast the beans). This may mean roasting all beans to exactly the same degree of roast (e.g., color of roast) or it may mean creating a 'roast blend' where some beans are roasted to a different degree purposefully to get a desired taste profile in the final beverage (as an alternative, for the lamp based system, several separate cavities may be created with each cavity containing a subset of beans and each lamp can be controlled separately based on feedback sensors to optimize roast within that cavity). The beans from the several cavities are mixed before grinding. It may be possible to use an array of small resistive heating elements with each element in contact with one bean as an alternative to a light based heating system. In any of these cases, this is a completely novel invention to individually control roasting of coffee beans.

The machine 16 would automate handling of the beans to move them from stage to stage of processing as needed. For example, moving between roasting and grinding, or moving between grinding and brewing. This may be considered as a robotic handling method that is new in a coffee machine. The machine 16 would have a receptacle for accepting the coffee pod 14. The pod would be sealed but the machine 16 would have a method for automatically opening the pod 14 and dispensing the contents as needed to the first stage of processing.

Grind Embodiments

The machine 16 would have a grinding stage 40 where the roasted beans are ground into fine particles. The average particle size may vary between 50 microns to 2000 microns. The electrically powered grinder would be adjustable to a desired particle size. The grinder may be a blade grinder 29, burr grinder 28 (e.g., a disc burr grinder, conical burr grinder, etc.), or any other grinder. A grinder that produces a uniform particle size is desirable. The time taken for grinding may be 1 to 10 seconds, 11 to 30 seconds, 31 to 60 seconds, 61 to 120 seconds, or 121 seconds and greater. After the roasting stage, the machine automatically moves the beans from the roasting stage to the proper location for grinding. After grinding, the machine automatically moves the beans to the proper location for brewing. The time taken to move between stages may be less than or equal to 1 second, 1.01 to 10 seconds, 10.01 to 45 seconds, etc.

Brewing Embodiments

After grinding, the ground particles are moved into the brewing stage 50. Coffee brewing is performed by passing heated water through the grounds which extracts the coffee into the liquid. The machine would have a rapid water heating system 32 to quickly bring water to the proper temperature. The water temperature may be brought to boiling (212 F), or some other temperature range such as 150 to 160 F, 161 to 175 F, 176 to 195 F, 196 to 211 F, etc. A water temperature in the range of 195 to 205 F is considered to be desirable for brewing coffee. The coffee grounds may be placed in a chamber with a filter at the bottom of the chamber and the filter may be paper or metallic. The coffee grounds may be tamped or compressed by the machine 16 as desired. The pressure of compression may be varied by the machine 16 as desired. The water may be injected into this chamber at high pressure. The water pressure may range from 0.1 bar to 18 bar depending on the coffee type (e.g., coffee, espresso, etc.) desired and the desired taste of coffee. A refractometer or other sensors may built into the coffee machine to provide real time measurement and feedback control of various brew parameters to optimize coffee taste. The time required to brew coffee would ideally be <1 minute. The amount of water used in making the cup of coffee may be any amount from 0.1 ounces to 20 ounces. The brewing time may be <1 second, 1.01 to 30 seconds, 30.01 to 60 seconds, or 60.01 seconds or longer.

In an alternative brewing method, the water may be poured on top of the coffee grounds and mixed with the grounds. The coffee liquid may then be 'sucked' out of the chamber with a vacuum system 34. The coffee grounds would remain in the chamber separate from the coffee liquid due to a filter that does not allow the coffee grounds to pass.

Figure 11:
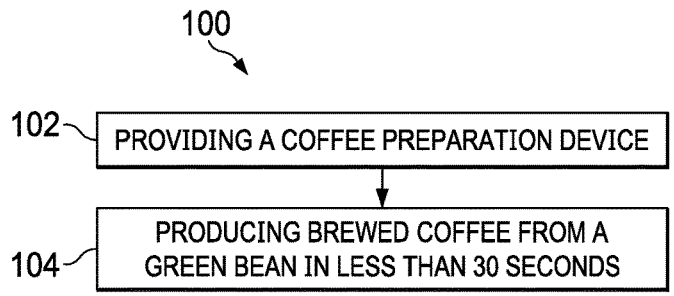
FIG. 11 depicts a flow chart showing a method of brewing coffee according to one embodiment.
Figure 12:
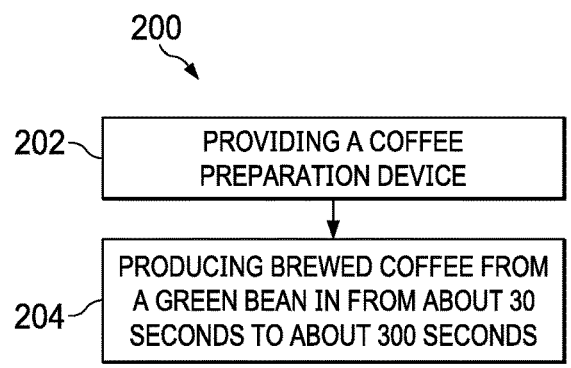
FIG. 12 depicts a flow chart showing a method of brewing coffee according to an alternate embodiment.

The total time for making a cup of coffee with this machine from the time the user initiates operation may be <30 seconds (e.g. method 100 as shown in FIG. 11), 30.01 to 60 seconds, 60.01 to 120 seconds, 120.01 to 180 seconds, 180.01 to 300 seconds (e.g., method 200 shown in FIG. 12), or 300.01 seconds or greater. As mentioned earlier, it is desirable that the coffee making machine make the cup of coffee as fast as possible while maintaining highest quality. The machine would dispense the coffee into a coffee cup.

Additional Embodiments

The machine 16 may have the capability to infuse 36 flavors and/or nutrients/vitamins into the final beverage. At stages after roasting, the machine may inject flavors (e.g., chocolate, hazelnut, etc.) or nutrients (e.g., vitamins, antioxidants, etc.) into the mixture such that this material is retained in subsequent steps and remains in the final beverage.

The machine 16 may have an internet connection either through wired or wireless means. This internet connection would enable the features described above. In particular, the machine 16 would be able to interact with central servers to upload and download information about beans, optimized recipes for preparation, initiating coffee preparation from remote or local mobile devices, mobile apps, etc.

One purpose of the many controls used in this machine 16 is to optimize the taste of the beverage for the final consumer to their specific desires. The taste sensors (taste buds) on each person's tongue are unique and different and cause individuals to respond differently to the same preparation. Thus, we envision the possibility of a method to determine the variation in taste sensors on a person's tongue and using that information to optimize the coffee making process to that individual. This effectively requires a sensor system that can map and 'taste' the corresponding taste sensors on the tongue, which can be done optically, spectroscopically, or through chemical sensors that map the tongue. This information could then be transmitted to the coffee machine 16 and algorithms optimize coffee preparation for that person's tongue.

In another application of using lasers to assist in the coffee making process, the coffee beans could have small holes drilled through the bean using a laser. High pressure water could be injected through these holes to fracture the bean (e.g. bean fracking) into small particles and thus replace traditional grinding. Additionally it may be possible to inject hot water or steam into the small holes and use this to brew or extract the coffee from the bean in a new way (e.g. 'in bean brewing'). The steam passes thru the beans and is condensed to form the beverage.

Another way to make coffee using a coffee pod system is to perform all functions of roast, grind brew within the pod itself. The pod with green coffee beans may contain resistive heater elements that mate to current sources in the machine to roast coffee. Or the pod may be transparent to allow optical energy provided by the machine to impinge upon the beans and roast the beans. The machine may break the seal of the pod or puncture the pod as needed during these steps. Another approach to grinding is to apply sonic energy to the roasted beans to cause the beans to fracture into small particles; and/or high pressure water may be applied to the beans to cause them to fracture. Water may be injected into the pod in order to brew the coffee.

I claim:

1. A coffee preparation machine comprising:
    a. a pod, the pod being single-serve and insertable into the coffee preparation machine, the pod including;
        i. a container portion containing a plurality of coffee beans,
        ii. a seal, the seal being operably configured to retain the plurality of coffee beans inside the container portion, prior to insertion of the pod into the coffee preparation machine, wherein the seal is selectively removable after insertion of the pod into the coffee preparation machine;
        iii. a filter of the pod;
    b. a roasting system, the roasting system being operably configured to roast each of the plurality of coffee beans;
    c. a grinding system, the grinding system being operably configured to grind each of the plurality of coffee beans into coffee grounds; and
    d. a brewing system operably configured to brew the coffee grounds, wherein the brewing system, the roasting system, and the grinding system are housed within a single self-contained unit of the coffee preparation machine.

2. The coffee preparation machine of claim 1, wherein the roasting system further comprises a laser for heating the plurality of coffee beans, where the wavelength of the laser is selected for absorption by the plurality of coffee beans.

3. The coffee preparation machine of claim 1, wherein the roasting system, the grinding system, and the brewing system are operably configured to penetrate the pod.

4. The coffee preparation machine of claim 1, wherein the roasting system, the grinding system, and the brewing system cooperate to produce brewed coffee in less than 30 seconds.

5. The coffee preparation machine of claim 1, wherein the roasting system, a quenching system, the grinding system, and the brewing system cooperate to produce brewed coffee in from about 30 seconds to about 300 seconds,
wherein the roasting system is configured to raise its temperature at a rate of at least 2 C per second;
wherein the quenching system is configured for water immersion quenching or forced air quenching.

6. The coffee preparation machine of claim 1, wherein the roasting system includes at least one radiation heating element.

7. The coffee preparation machine of claim 6, wherein the at least one radiation heating element is a lamp.

8. The coffee preparation machine of claim 7, comprising a plurality of radiation heating elements.

9. The coffee preparation machine of claim 7, comprising an optical cavity that collects and directs light from the at least one radiation heating element to the plurality of coffee beans.

10. The coffee preparation machine of claim 1, wherein the roasting system comprises a laser operably configured to frack each of the plurality of coffee beans by drilling one or more holes in each of the beans and an injector for injecting hot water or steam into the laser-drilled holes in each of the beans.

11. The coffee preparation machine of claim 1, wherein the seal of the pod is operably configured to be opened with the coffee preparation machine after insertion into the coffee preparation machine.

12. The coffee preparation machine of claim 1, further comprising a sensor to monitor a roasting status of the plurality of coffee beans.

13. The coffee preparation machine of claim 1, wherein the pod includes an information code.

14. A coffee preparation machine comprising:
a. a pod, the pod being insertable into the coffee preparation machine,
the pod including;
　i. a container portion containing a plurality of coffee beans,
　ii. a seal, the seal being operably configured to retain the plurality of coffee beans inside the container portion, prior to insertion of the pod into the coffee preparation machine, wherein the seal is selectively removable after insertion of the pod into the coffee preparation machine;
　iii. a filter of the pod;
b. a roasting system, the roasting system being operably configured to roast each of the plurality of coffee beans;
c. a grinding system, the grinding system being operably configured to grind each of the plurality of coffee beans into coffee grounds; and
d. a brewing system operably configured to brew the coffee grounds, wherein the brewing system, the roasting system, and the grinding system are housed within a single self-contained unit of the coffee preparation machine.

15. The coffee preparation machine of claim 14, wherein the roasting system further comprises a laser for heating the plurality of coffee beans, where the wavelength of the laser is selected for absorption by the plurality of coffee beans.

16. The coffee preparation machine of claim 14, wherein the roasting system, a quenching system, the grinding system, and the brewing system cooperate to produce brewed coffee in from about 30 seconds to about 300 seconds,
wherein the roasting system is configured to raise its temperature at a rate of at least 2 C per second;
wherein the quenching system is configured for water immersion quenching or forced air quenching.

17. The coffee preparation machine of claim 14, wherein the roasting system includes at least one radiation heating element.

18. The coffee preparation machine of claim 17, comprising an optical cavity that collects and directs light from the at least one radiation heating element to the plurality of coffee beans.

19. The coffee preparation machine of claim 14, wherein the roasting system comprises a laser operably configured to frack each of the plurality of coffee beans by drilling one or more holes in each of the beans and an injector for injecting hot water or steam into the laser-drilled holes in each of the beans.

20. The coffee preparation machine of claim 14, further comprising a sensor to monitor a roasting status of the plurality of coffee beans.

* * * * *